United States Patent
Yoshihara et al.

(12)

(10) Patent No.: US 6,780,940 B2
(45) Date of Patent: Aug. 24, 2004

(54) ADHESIVE RESIN COMPOSITION AND METHOD FOR SEPARATING ADHERENDS BONDED TOGETHER BY THE COMPOSITION

(75) Inventors: Nori Yoshihara, Otsu (JP); Kenji Ohama, Otsu (JP); Satoshi Sakai, Otsu (JP); Hitoshi Kosugi, Otsu (JP); Koji Nakanishi, Otsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 268 days.

(21) Appl. No.: 09/960,935

(22) Filed: Sep. 25, 2001

(65) Prior Publication Data

US 2002/0061968 A1 May 23, 2002

(30) Foreign Application Priority Data

Sep. 25, 2000 (JP) ........................................ 2000-290989
Nov. 8, 2000 (JP) ........................................ 2000-340794

(51) Int. Cl.$^7$ ................................................ C08K 3/10
(52) U.S. Cl. ...................... 525/401; 524/406; 524/407; 524/440; 156/272.2; 156/275.7; 156/344; 425/175; 525/100
(58) Field of Search ................................ 524/401, 406, 524/407, 440; 156/272.2, 275.7, 344; 425/175; 525/100

(56) References Cited

U.S. PATENT DOCUMENTS 5,620,794 A * 4/1997 Burkart et al. .............. 428/343

FOREIGN PATENT DOCUMENTS

| DE | 199 54 960 A1 | 6/2000 |
| EP | 0 521 825 A2 | 1/1993 |
| JP | 07314559 A * | 12/1995 |
| JP | 9-188859 | 7/1997 |
| JP | 10-47580 | 2/1998 |
| JP | 2000-159938 | 6/2000 |
| WO | WO 00/73398 A1 | 12/2000 |

OTHER PUBLICATIONS

G. Habernicht, "Kleben: Grundlagen, Technologie, Anwendungen," 3. Auflage, 1997, Kapitel 2.3.4.4, Seiten 123–124, Springer Verlag.

* cited by examiner

*Primary Examiner*—William Cheung
(74) *Attorney, Agent, or Firm*—Foley & Lardner

(57) ABSTRACT

The present invention relates to an adhesive resin composition comprising a heat-generating material (A) which generates heat when subjected to high frequency induction and a thermoplastic resin (B) modified with a monomer having a functional group which reacts with an inorganic, the thermoplastic resin (B) having a melting point ranging from 90° C. to 200° C. The present invention also relates to a method for separating a bonded article into adherends, the method comprising detaching by induction heating the bonded portions of adherends bonded together by the thermoplastic resin composition comprising a heat-generating material (A) which generates heat when subjected to high frequency induction and a thermoplastic resin (B) modified with a monomer having a functional group which reacts with an inorganic substance and has a melting point ranging from 90° C. to 200° C.

6 Claims, No Drawings

ADHESIVE RESIN COMPOSITION AND METHOD FOR SEPARATING ADHERENDS BONDED TOGETHER BY THE COMPOSITION

FIELD OF THE INVENTION

The present invention relates to a resin composition for bonding glass and resin. Specifically, the present invention relates to an adhesive thermoplastic resin composition which can bond glass and reinforced resin in a short period of time without using a heating furnace, and has high adhesive strength at 80° C.

The present invention also relates to a method for rapidly and safely separating adherends bonded together by the above adhesive thermoplastic resin composition without using a heating furnace and without tearing or damaging these adherends so that these adherends can be easily sorted for reuse or recycling.

BACKGROUND OF THE INVENTION

Heretofore, glass and reinforced resins have been bonded together by applying a primer to the glass, drying the glass and then curing and bonding a urethane adhesive. However, this method has the problem of the drying of the solvents and the curing reaction of urethane requiring a long time, as well as the problem associated with using solvents. Hot melt adhesives for bonding glass and resin, which have been developed recently, have low adhesive strength at high temperatures and thus often fail to develop performance as high as required. Japanese Unexamined Patent Publication No. 2000-159938 discloses development of a hot melt adhesive useful for bonding glass and resin. This adhesive necessitates a large heating furnace for heating the large glass plates and formed resin articles used and requires a cycle of heating and cooling operations. This great difficulty prevents practical industrial use of the adhesive.

Japanese Unexamined Patent Publication No. 1998-47580 discloses an IH heater for a hot melt adhesive that includes a material that generates heat when exposed to high frequency induction (heat-generating material) which bonds synthetic resin materials or a synthetic resin material and a metal material using a joint. According to the above invention, the adhesive strength between inorganic reinforced thermoplastic resins and glass is very low. Particularly, the adhesive is not practically usable at 80° C. Therefore, development of an adhesive for glass and inorganic reinforced thermoplastic resins has been desired.

Until now, bonded adherends have been pulverized and dumped. Thus, such parts could not be sorted, reused or recycled. Using a hot melt adhesive to join adherends also has problems because this method requires a large heating furnace since the whole assembly needs to be treated at a high temperature, and adherends thus joined cannot be recycled because they deteriorate when heated. Further, this method requires a cycle of heating and cooling operations, and thus cannot be put into practical use because of this large barrier to industrialization.

In light of the above situation, the recent recycling-oriented society has been strongly demanding a separation method for such adherends which enables reuse of these resources.

An object of the present invention is to provide a thermoplastic resin composition which is a solvent-free heat-resistant hot melt adhesive that bonds in a short period of time without using a heating furnace, and has high adhesive strength between glass and an inorganic reinforced thermoplastic resin at 80° C.

Another object of the present invention is to provide a separation method which does not use a heating furnace and which allows rapid separation and recycling of adherends.

DISCLOSURE OF THE INVENTION

In order to solve the above-mentioned problems, the inventors of the present invention have conducted extensive research and consequently they accomplished the present invention. Specifically, the present invention provides the following adhesive resin compositions and methods for separating the adherends bonded together by these compositions.

1. An adhesive resin composition comprising a heat-generating material (A) which generates heat when subjected to high frequency induction and a thermoplastic resin (B) modified with a monomer having a functional group which reacts with an inorganic substance, the thermoplastic resin (B) having a melting point ranging from 90° C. to 200° C.

2. The adhesive resin composition according to item 1, wherein the thermoplastic resin (B) having a functional group which reacts with an inorganic substance is a polyolefin copolymer modified with a silane compound and/or titanate compound.

3. The adhesive resin composition according to item 1, wherein the heat-generating material (A) is iron and is contained in an amount of at least 10% by weight.

4. A method for separating a bonded article into adherends, the method comprising detaching by induction heating the bonded portions of the adherends bonded together by a thermoplastic resin composition comprising a heat-generating material (A) and a thermoplastic resin (B) modified with a monomer having a functional group which reacts with an inorganic substance and has a melting point ranging from 90° C. to 200° C.

5. The method for separating a bonded article according to item 4, wherein at least one of adherends is glass.

In the present invention, as the heat-generating material (A) which generates heat when subjected to high frequency induction are used carbon steel, alpha iron, gamma iron, delta iron, copper, brass, aluminum, iron-nickel alloy, iron-nickel-chromium alloy, carbon fiber, carbon black and the like. Among these, iron-based substances are favorable in terms of induction heating characteristics, deterioration of resin and relative inexpensiveness. The amount of the heat-generating material used varies depending on its form. The amount is preferably 10 to 90% by weight, more preferably 30 to 80% by weight, particularly preferably 50 to 75% by weight. An amount lower than 10% by weight is not favorable because the heating value is insufficient so that it takes a long time until the adhesive is heated to a temperature which allows adhesion. An amount higher than 90% by weight is unfavorable since adhesive strength is lowered. The heat-generating material may be in any form such as a powder, needles, scales, a mesh, and a nonwoven fabric. The form of the heat-generating material is selected depending on the adhesion process. Heat-generating materials in the form of a powder, needles or plate crystalline or platelike powder are often incorporated into the adhesive resin composition. When the heat-generating material is incorporated, the amount of the heat-generating material is preferably 40 to 80% by weight because of its low heat-generating property. Heat-generating material in the form of a mesh is used in lamination or insert molding. When the heat-generating material is used in lamination, the amount used is preferably 10 to 50% by weight. When the heat-generating material is incorporated, the particle size is preferably 10 to 3000 μm.

The thermoplastic resins used in the present invention which comprise the component (B) whose melting point ranges from 90 to 200° C. include polyolefin resins, polyamide-based resins, polyester-based resins, among others. The copolymers of these resins are especially preferable in terms of adhesiveness. Considering the need for adhesive strength at a high temperature, the melting point should be at least 90° C., preferably at least 100° C. A melting point higher than 200° C. is unfavorable because the inorganic reinforced thermoplastic resin to be bonded with is partially melted. In view of adhesion processability and adhesive strength at a high temperature, the melting point is particularly preferably 100° C. to 150° C.

In component (B), examples of a functional group which reacts with an inorganic substance introduced into the above resin to increase the adhesiveness to glass include a silane group, silanol group, titanate group, among others. Monomer containing such functional group include a silane compound, titanate compound, among others. Examples include γ aminopropyltriethoxysilane, β (3,4epoxycyclohexyl) ethyltrimethoxysilane, γ glycidoxypropyltrimethoxysilane, γ methacryloxypropyltrimethoxysilane, N-β (aminoethyl) γ aminopropyltrimethoxysilane, acylate-based titanate, phosphate-based titanate and alcoholate-based titanate.

The method for preparing component (B) in the present invention, i.e., the thermoplastic polymer modified with a monomer having a functional group which reacts with an inorganic substance and having a melting point ranging from 90° C. to 200° C., is not particularly limited. The especially favorable method for preparing the resins in the present invention are mentioned below.

The polyolefin resins preferably comprise at least one member selected from polypropylene copolymer resins, copolymerized polyethylene-based resins, ethylene-propylene copolymer, ethylene-propylene-diene-based resins and ethylene-α olefin-based resins. In order to increase adhesiveness, the polyolefin resins are preferably copolymers comprising 3 to 50 mol % of such monomer components as vinyl acetate, methyl methacrylate, ethyl acrylate, methacrylic acid, acrylic acid, methacrylic acid salt and the like. A mixture of a copolymerized polyolefin having a high melting point and a flexible polyolefin-based elastomer can achieve both heat resistance and adhesiveness, which is an object of the present invention. It is more preferable that monomers such as a carboxylic anhydride group, an epoxy group, a hydroxyl group or an isocyanate group are copolymerized or graft-polymerized. Copolymerization of unsaturated carboxylic acid monomers and glycidyl methacrylate and graft modification of maleic anhydride are preferable. Introduction of this functional group stabilizes the above silanol and titanate compounds and improves adhesiveness to the reinforced thermoplastic resin.

As the polyamide-based resins are used the polyamide-based copolymers which have a melting point ranging from 90° C. to 200° C. including at least 2 copolymers selected from nylon 6, nylon 66, nylon 11, nylon 12, nylon 610, nylon MXD6, nylon trimethylhexamethylenediamine 6, nylon trimethylhexamethylenediamine 12, nylon isophorone diamine 6 and the like. Examples include nylon 6/66/12, nylon 6/66/11/12 and nylon 6/610/12 copolymers which have a melting point ranging from 110 to 140° C. The polyamide-based resins are preferably reacted with the above coupling agent which is reactive with a terminal amino group or carboxyl group.

As the polyester-based resins are used copolymerized polyesters having a melting point ranging from 90° C. to 200° C. including dicarboxylic acid components such as terephtalic acid, isophthalic acid, paraphenylenedicarboxylic acid, 2,6 naphthalene dicarboxylic acid, 1,4-cyclohexanedicarboxylic acid, adipic acid, sebacic acid, and glycol components such as ethylene glycol, butanediol, 1,3 propyleneglycol, hexanediol, neopentyl glycol, 1,4 cyclohexanedimethanol bisphenol A ethylene oxide adduct, diethylene glycol, polyalkylene glycol and the like. Examples include terephthalic acid/isophthalic acid/ethylene glycol, terephthalic acid/sebacic acid/ethylene glycol, terephthalic acid/isophthalic acid/ethylene glycol/bisphenol A ethylene oxide adduct, terephthalic acid/ethylene glycol/neopentyl glycol and the like. The polyester-based resins preferably contain the above coupling agent which is reactive with a terminal carboxyl group and hydroxyl group.

In the present invention, when the heat-generating material which generates heat when subjected to high frequency induction is used in the adhesive composition, it is preliminarily melted and kneaded into the thermoplastic resin having a melting point ranging from 90° C. to 200° C. by an extruder, a kneader and a roll, stacked on the thermoplastic resin formed into a sheet and then sandwich-molded, formed into a mesh, inserted into a mold and injection-molded. The type of the extruder, kneader and roll used and kneading conditions are not particularly limited.

The adhesive resin composition of the present invention may contain commonly used additives, for example, thermal stabilizers, weathering agents, hydrolytic stabilizers and pigments. Thermal stabilizers include hindered phenol-based, thioether-based, phosphite-based and phosphate-based thermal stabilizers, and combinations thereof. Weathering agents include carbon black, benzophenone, triazole-based, hindered amine-based and like weathering agents. Anti-hydrolysis agents include carbodiimide, bisoxazoline, epoxy and isocyanate compounds. Pigments include the heat-resistant pigments commonly used for polyethylene terephthalate-based polymers.

The adhesive resin composition which the present invention provides is used for bonding, for example, layers of various materials. Layering combinations include a glass plate/the adhesive composition of the present invention/a molded article of an inorganic reinforced thermoplastic resin, and a glass plate/the resin composition of the present invention, the adhesive resin composition of the present invention/an inorganic reinforced thermoplastic resin composition. The layers are placed between coils under pressure and high-frequency alternating current is applied to the layers to induce a current in the heat-generating material in the adhesive composition to generate heat. The temperature of the adhesive composition rises over time, and when the composition is heated above its melting point, the composition starts to flow and develop adhesion. When the layers are bonded, the alternating current is stopped or the molded article bonded to the glass is placed outside the lines of magnetic force to be cooled or is air-cooled. The assembly is bonded together at a temperature not lower than the melting point of the adhesive composition of the present invention and is used at a temperature not higher than this melting point.

The method for separating a bonded article according to the present invention can be used, for example, for the following molded articles: assemblies containing at least one glass plate, ceramic plate, resin plate, metal plate, wood plate or the like. Further examples include assemblies of a glass plate/an adhesive containing a high frequency induction heat-generating material/glass, a glass plate/an adhesive containing a high frequency induction heat-generating material/a molded resin article, glass/an adhesive containing an high frequency heat-generating material/a metal, a molded article of a thermoplastic resin/an adhesive containing a high frequency induction heat-generating material/a molded resin article, a metal/an adhesive containing a high frequency heat-generating material/a metal, a metal/an adhesive containing a high frequency heat-generating material/a molded resin article, among others.

The separation method comprises the steps of, for example, placing the bonded portion of adherends between coils and applying a high-frequency alternating current to the bonded portion. Thereby a current is induced in the heat-generating material in the adhesive to generate heat and raise the temperature of the adhesive over time. When the adhesive is heated to its melting point or higher, the adhesive flows and the parts are detached. When the parts are detached, the alternating current is stopped or the separated formed article is placed outside the lines of magnetic force to be cooled or is air-cooled. The separation method of the present invention is preferably carried out at a temperature not lower than the melting point of the adhesive but not higher than the melting point or decomposition temperature of the adherends.

Using the adhesive composition of the present invention eliminates the necessity of heating the entire adherends in a heating furnace because only the adhesive layer needs to be heated by high frequency induction. Therefore, the adhesive composition is especially useful for large adherends. In addition, since the adhesive composition of the present invention allows selective heating of the adhesive layer, it can be effectively used for assembling adherends which include any parts having low heat resistance.

The parts comprising glass and formed articles of a inorganic reinforced thermoplastic resin using the adhesive composition of the present invention as an adhesive are used for automobiles, electronics, office automation equipment, building materials, etc.

By using the method of the present invention for separating a bonded article into adherends, only the bonded portions are heated by high frequency induction. Therefore, the adherends need not be treated in a heating furnace. The method is thus especially useful for large adherends. Further, since the adhesive layer can be selectively heated, the method is also useful for assembling adherends which include parts having low heat resistance.

The separation method of the present invention can be also applied to articles joined with an adhesive containing a high frequency induction heat-generating material and recovered from used automobiles, electronics, office automation equipment, building materials, among others.

BEST MODE FOR CARRYING OUT THE INVENTION

The following Examples illustrate the present invention in detail.

The adhesive strength of the adhesive resin composition of the invention was measured in terms of tensile shear strength in the following manner.

Into the hopper of an injection molding machine at a cylinder temperature of 250–260–260° C. were placed pellets of 30 wt. % glass fiber-reinforced polybutylene terephthalate (EMC730, manufactured by TOYOBO CO., LTD.) dried at 140° C. for 3 hours, or pellets of 30 wt. % glass fiber-reinforced nylon 6 (T402, manufactured by TOYOBO CO., LTD.) dried at 120° C. for 1 hour, to obtain an ASTM D638 TYPE 1 tensile test specimen. The specimen was cut at the center of its length. Then, the rectangular portion (12.7 mm×25.4 mm) of each cut piece of the specimen was covered with a 12.7 mm×25.4 mm piece cut out from a 1 mm thick test adhesive sheet. The covered portions were aligned on either end of a glass plate (33 mm×100 mm×3 mm).

The resulting structure was held between air cylinders having a diameter of 20 mm. Using a high frequency induction heating unit (SPM-3HN, manufactured by MIY-ADEN CO., LTD., 3 KW, 2 MHz), lines of magnetic force were generated by electromagnetic induction from coils disposed in the vicinity of the ends of the cylinders to carry out heating for various times under various pressures, thereby melting and allowing adhere the adhesive layer. The structure was then cooled with air for 5 minutes, giving a test sample for adhesive strength evaluation.

As another method, the covered portions were held to the glass plate with clips (No. 111, manufactured by LION OFFICE PRODUCTS CORP.) and treated at 140° C. for 20 minutes. After cooling at 23° C. for 1 hour, the clips were removed, giving a test sample for adhesive strength evaluation.

The test samples having a glass plate in the middle were set in the chuck of a universal tensile tester (TENSILON TYPE UTM1, Orientec Co., Ltd.) having a heating furnace. The tensile shear strength was measured at a deformation rate of 5 mm/min and at test temperatures of 23° C. and 80° C.

Subsequently, samples for testing the separating method of the invention were prepared in the following manner, and subjected to separation tests.

1) Molded resin: An ASTM D638 TYPE 1 tensile test specimen with a thickness of 3 mm made of 30 wt. % glass fiber-reinforced polybutylene terephthalate (EMC730, manufactured by TOYOBO CO., LTD.)
2) Glass plate: A glass plate (30 mm×80 mm) cut out from a 4 mm thick glass plate for automobile windows.
3) Aluminum plate: An aluminum plate of the ASTM D638 TYPE 1 specimen size, cut out from a 1.6 mm thick aluminum plate for window frames
4) Polyolefin adhesive I: A 1 mm thick molded sheet which comprises a polyethylene copolymer modified with 0.5 wt. % of epoxy silane and having a melting point of 115° C., and 60 wt. % of iron powder with a particle size of 50 $\mu$
5) Polyolefin adhesive II: A 1 mm thick molded sheet which comprises a polyethylene copolymer modified with 0.5 wt. % of epoxy silane and having a melting point of 115° C. and 40 wt. % of iron powder with a particle size of 50 $\mu$
6) Polyolefin adhesive III: A 1 mm thick molded sheet which comprises a polyethylene copolymer modified with 0.5 wt. % of epoxy silane and having a melting point of 115° C.
7) Polyester adhesive I: A 1 mm thick molded sheet which comprises a terephthalic acid/isophthalic acid/ethylene glycol/butanediol copolymer modified with 0.5 wt. % of epoxy silane and having a melting point of 125° C., and 60 wt. % of iron powder with an average particle size of 50 $\mu$
8) Polyester adhesive I: A 1 mm thick molded sheet which comprises a terephthalic acid/isophthalic acid/ethylene glycol/butanediol copolymer modified with 0.5 wt. % of epoxy silane and having a melting point of 125° C.
9) Adhesion sample: The rectangular portion (12.7 mm×25.4 mm) of each cut piece of the molded resin test specimen was covered with a 12.7 mm×25.4 mm piece of molded adhesive sheet. The covered portions were aligned on either end of a 30 mm×80 mm glass plate. The covered portions were held to the glass plate with clips (No. 111, manufactured by LION OFFICE PRODUCTS CORP.), and treated at 140° C. for 20 minutes to prepare an adhesion sample.
10) Adhesive strength: The adhesion sample was set in the chuck of a TENSILON TYPE UTM 1 having a heating furnace. The tensile shear strength was measured at a deformation rate of 5 mm/min and at a test temperature of 23° C.
11) Separation test Adhesion samples were prepared using the components shown in Table 1A. Using a high frequency induction heating unit (SPM-3HN, manufactured by MIYADEN CO., LTD., 3 KW, 2 MHz), lines of magnetic force were generated from coils disposed in the vicinity of the ends of cylinders to heat the adhesion sample for various times. The time required for melting and separating the adhesive layer was measured.

EXAMPLES OF THE ADHESIVE RESIN COMPOSITION OF THE INVENTION

Examples 1A to 12A and Comparative Examples 1A to 4A

The pelletized hot-melt adhesives and high frequency induction heat generating powders shown in Table 1A were preliminarily mixed in the proportions shown in Table 1A. The resulting mixtures were individually placed into the hopper of a 30 mm diameter twin-screw extruder (PCM30, manufactured by Ikegai Tekko K.K.) at a barrel temperature of 220° C., melted, kneaded and extruded into strands. The strands were cooled and cut into 3 mm pellets. The pellets were placed into the hopper of an injection molding machine (IS100, manufactured by TOSHIBA MACHINE CO., LTD.) at a cylinder temperature of 220° C., and molded at a mold temperature of 50° C. into a 1 mm thick sheet (100 mm×100 mm). Test adhesive sheets obtained in the above manner were tested for adhesive strength. Table 1A shows the test results.

Example 13A

A copolymerized polyethylene/ethylene ethyl acrylate mixture modified with 0.5 wt. % of epoxy silane (A187, manufactured by UNION CARBIDE CORP.) and having a melting point of 110° C. was placed into the hopper of an injection molding machine at a cylinder temperature of 200° C., and molded at a mold temperature of 50° C. into a 1 mm thick test adhesive sheet. In the mold cavity (100 mm ×100 mm) of the injection molding machine, a 100-mesh stainless wire cloth #316 (manufactured by WATANABE GIICHI SEISAKUSHO CO., LTD.) had been inserted so as to incorporate the wire cloth into the test adhesive sheet.

A 12.7 mm×25.4 mm test piece was cut out from the test adhesive sheet and used to bond glass with 30 wt. % glass fiber-reinforced molded polybutylene terephthalate by high frequency induction. The obtained adhesion sample was subjected to tensile shear test to determine the adhesive strength. The adhesive strengths at 23° C. and 80° C. were 7.2 MPa and 2.8 MPa, respectively.

Example 14A

An adhesive sheet was prepared in the same manner as in Example 12A except that the wire cloth was not used. An adhesion sample was prepared by laminating a glass plate, a stainless steel wire cloth #316 (manufactured by Watanabe Giichi Seisakusho Co., Ltd.), the adhesive sheet, and 30 wt. % glass fiber-reinforced molded polybutylene terephthalate, and then heating the laminated article using the same induction heating unit as in Example 1A, for 1 minute. The obtained sample was subjected to a tensile shear test to determine the adhesive strength. The adhesive strengths at 23° C. and 80° C. were 6.2 MPa and 2.3 MPa, respectively.

Example 15A

An adhesion sample was prepared in the same manner as in Example 13A except that Metron film nylon (a modified polyamide adhesive manufactured by DIABOND INDUSTRY CO., LTD.) was used as an adhesive sheet, and tested for adhesive strength. The adhesive strengths at 23° C. and 80° C. were 5.5 MPa and 2.1 MPa, respectively.

TABLE 1A

|  |  | Example | | | | | | | | | | | | Comp. Ex. | | | |
| --- | --- | --- | --- | --- | --- | --- | --- | --- | --- | --- | --- | --- | --- | --- | --- | --- | --- |
|  |  | 1A | 2A | 3A | 4A | 5A | 6A | 7A | 8A | 9A | 10A | 11A | 12A | 1A | 2A | 3A | 4A |
| Proportion | PO-1 | 70 | 50 | 40 | 40 | 40 | 40 | 40 | 40 |  |  |  |  | 100 |  |  |  |
| (wt. %) | PO-2 |  |  |  |  |  |  |  |  | 40 |  |  |  |  |  |  |  |
|  | PO-3 |  |  |  |  |  |  |  |  |  |  |  |  |  | 40 |  |  |
|  | PE-1 |  |  |  |  |  |  |  |  |  | 40 |  |  |  |  |  |  |
|  | PE-2 |  |  |  |  |  |  |  |  |  |  | 40 | 40 |  |  |  |  |
|  | PE-3 |  |  |  |  |  |  |  |  |  |  |  |  |  |  | 40 | 40 |
|  | Fe100 | 30 | 50 | 60 | 60 | 60 | 60 |  |  | 60 | 60 | 60 | 60 |  |  | 60 | 60 |
|  | Fe200 |  |  |  |  |  |  | 60 |  |  |  |  |  |  |  |  |  |
|  | Cu100 |  |  |  |  |  |  |  | 60 |  |  |  |  |  |  |  |  |
| Reinforced | EMC730 | x | x | x | x | x | x | x | x | x | x | x |  | x | x | x | x |
| resin adherend | T-402 |  |  |  |  |  |  |  |  |  |  |  | x |  |  |  |  |
| Time | min. | 10 | 3 | 2 | 3 | 3 | 5 | 3 | 15 | 3 | 3 | 3 | 3 | 3 | 3 | 3 | 10 |
| Pressure | atm. | 4 | 4 | 4 | 4 | 6 | 4 | 4 | 4 | 4 | 4 | 4 | 4 | 4 | 4 | 4 | 4 |

TABLE 1A-continued

|  |  |  | Example |  |  |  |  |  |  |  |  |  |  |  | Comp. Ex. |  |  |  |
|---|---|---|---|---|---|---|---|---|---|---|---|---|---|---|---|---|---|---|
|  |  |  | 1A | 2A | 3A | 4A | 5A | 6A | 7A | 8A | 9A | 10A | 11A | 12A | 1A | 2A | 3A | 4A |
| Adhesive strength | 23° C. | MPa | 6.4 | 6.2 | 5.8 | 6.1 | 5.9 | 6.6 | 5.6 | 5.5 | 5.3 | 4.4 | 5.2 | 4.8 | 0 | 4.3 | 0 | * |
|  | 80° C. | MPa | 2.9 | 2.6 | 2.0 | 2.5 | 2.4 | 2.4 | 2.3 | 2.1 | 3.1 | 1.9 | 2.3 | 2.0 | 0 | 0.2 | 0 | * |

PO-1: Silane-modified G196, G196 (polyolefin adhesive, KUREHA ELASTOMER CO., LTD.) having a melting point of 115° C.
PO-2: Silane-modified G156, G156 (polyolefin adhesive, KUREHA ELASTOMER CO., LTD.) having a melting point of 110° C.
PO-3: EVAFLEX EEA A713 (polyolefin adhesive, MITSUI-DU PONT POLYCHEMICALS CO., LTD.) having a melting point of 76° C.
PE-1: Silane-modified GM400, GM400 (polyester adhesive, TOYOBO CO., LTD.) having a melting point of 140° C.
PE-2: Silane-modified GM900, GM900 (polyester adhesive, TOYOBO CO., LTD.) having a melting point of 105° C.
PE-3: Silane-modified GP100, GP100 (polyester-based adhesive, TOYOBO CO., LTD.) having melting point of 215° C.
Fe100: ASC100 (iron powder, Hoganas AB) having an average particle size of 100 μ
Fe200: KIP300 (iron powder, Kawasaki Steel Corp.) having an average particle size of 200 μ
Cu100: CE-6 (copper powder, Fukuda Metal Foil & Powder Co., Ltd.) having an average particle size of 100 μ
*: The molded resin was deformed.

Examples of the Separation Method of the Invention

Examples 1B to 5B and Comparative Examples 1B to 9B

The bonded article samples shown in Tables 1B and 2B were tested for adhesive strength and separation time by the methods described above. Tables 1B and 2B show the test results. For comparison, Table 2B presents the separation time required when using a heating furnace at 140° C.

TABLE 1B

|  |  | Example |  |  |  |  | Comp. Ex. |  |
|---|---|---|---|---|---|---|---|---|
|  |  | 1B | 2B | 3B | 4B | 5B | 1B | 2B |
| Adherend 1 |  | Glass plate | Molded resin | Aluminum plate | Glass plate | Glass plate | Glass plate | Glass plate |
| Adherend 2 |  | Molded resin | Molded resin | Molded resin | Molded resin | Molded resin | Molded resin | Molded resin |
| Polyolefin adhesive I |  | x | x | x |  |  |  |  |
| Polyolefin adhesive II |  |  |  |  | x |  |  |  |
| Polyolefin adhesive III |  |  |  |  |  |  | x |  |
| Polyester adhesive I |  |  |  |  |  | x |  |  |
| Polyester adhesive II |  |  |  |  |  |  |  | x |
| Adhesive strength | MPa | 6.3 | 7.1 | 6.6 | 6.5 | 7.3 | 6.5 | 6.8 |
| Induction heating separation time | min. | 0.7 | 0.5 | 0.7 | 2.1 | 0.9 | Not separated | Not separated |

TABLE 2B

|  | Comparative Example |  |  |  |  |  |  |
|---|---|---|---|---|---|---|---|
|  | 3B | 4B | 5B | 6B | 7B | 8B | 9B |
| Adherend 1 | Glass plate | Molded resin | Aluminum plate | Glass plate | Glass plate | Glass plate | Glass plate |
| Adherend 2 | Molded resin | Molded resin | Molded resin | Molded resin | Molded resin | Molded resin | Molded resin |
| Polyolefin adhesive I | x | x | x |  |  |  |  |
| Polyolefin adhesive II |  |  |  | x |  |  |  |

TABLE 2B-continued

|  |  | Comparative Example | | | | | | |
|---|---|---|---|---|---|---|---|---|
|  |  | 3B | 4B | 5B | 6B | 7B | 8B | 9B |
| Polyolefin adhesive III |  |  |  |  |  |  | x |  |
| Polyester adhesive I |  |  |  |  |  | x |  |  |
| Polyester adhesive II |  |  |  |  |  |  |  | x |
| Adhesive strength | MPa | 6.3 | 7.1 | 6.6 | 6.5 | 7.3 | 6.5 | 6.8 |
| 140° C. separation time | min | 14 | 21 | 15 | 14 | 16 | 14 | 17 |

The adhesive resin composition of the invention is capable of bonding a glass plate and a molded reinforced resin in a short time without using a heating furnace. Accordingly, the composition enables industrial scale manufacture of large-sized members having high adhesive strength at 80° C., and thus is highly beneficial to the industry.

Tables 1B and 2B show that the method of separating bonded articles of the invention greatly reduces the separation time to 2/100 to 15/100 of the time required for conventional separation with a heating furnace at 140° C. Since the separating method can be carried out in a short period without using a heating furnace, it does not damage or deteriorate the materials of the articles, making recovery of large-sized members possible. The method is therefore highly beneficial to the industry.

The separating method of the invention is particularly advantageous when the adherends are fragile or of large size, because the method locally heats the adherends and thus does not necessitate a large heating furnace, and because the method does not apply any mechanical force to the adherends. For example, the method fully exhibits its advantages when at least one of the adherends is glass or ceramic.

We claim:

1. An adhesive resin composition comprising 10 to 90% by weight of a metal (A) selected from carbon steel, alpha iron, gamma iron, delta iron, brass, iron-nickel alloy and iron-nickel-chromium alloy and a thermoplastic resin (B) modified with a silane compound and/or titanate compound and having a melting point ranging from 90° C. to 200° C.

2. The adhesive resin composition according to claim 1, wherein the thermoplastic resin (B) is a polyolefin copolymer modified with a silane compound and/or titanate compound.

3. An adhesive resin composition comprising a heat-generating material (A) which generates heat when subjected to high frequency induction and a thermoplastic resin (B) modified with a monomer having a functional group which reacts with an inorganic substance, wherein the heat-generating material (A) is iron and is contained in an amount of at least 10% by weight and the thermoplastic resin (B) has a melting point ranging from 90° C. to 200° C.

4. A method for separating a bonded article into adherends, the method comprising detaching by induction heating the bonded portions of the adherends bonded together by a thermoplastic resin composition the adhesive resin composition of claim 1.

5. The method for separating a bonded article according to claim 4, wherein at least one of adherends is glass.

6. The adhesive resin composition according to claim 1 for high frequency induction.

* * * * *